J. F. WINKLER.
ANIMAL TRAP.
APPLICATION FILED SEPT. 16, 1911.
1,014,550.
Patented Jan. 9, 1912.
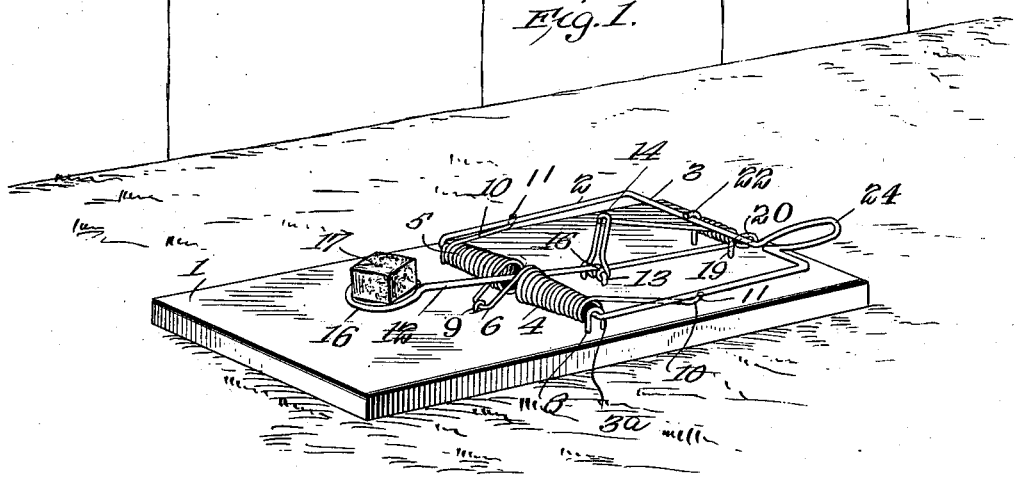
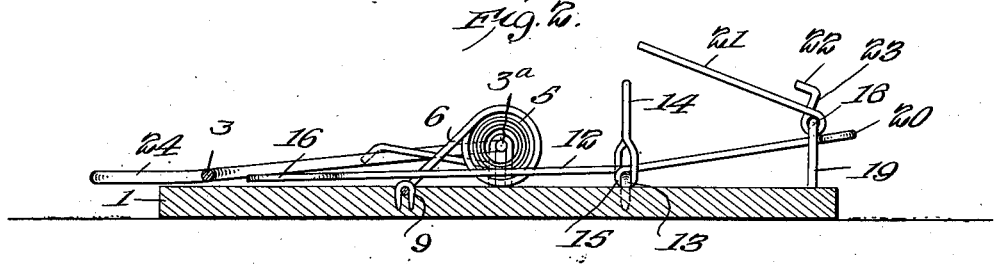
WITNESSES
E. M. Callaghan
Amos W Hart
INVENTOR
JOSEPH F. WINKLER
BY Munn & Co.
ATTORNEYS

UNITED STATES PATENT OFFICE.

JOSEPH F. WINKLER, OF DOLLAR BAY, MICHIGAN.

ANIMAL-TRAP.

1,014,550.      Specification of Letters Patent.      Patented Jan. 9, 1912.

Application filed September 16, 1911. Serial No. 649,603.

*To all whom it may concern:*

Be it known that I, JOSEPH F. WINKLER, a citizen of the United States, and a resident of Dollar Bay, in the county of Houghton and State of Michigan, have invented certain Improvements in Animal-Traps, of which the following is a specification.

My invention is an improvement in animal traps, and has for its object, the provision of a simple, inexpensive device of the striker type, wherein the holding means for the striker is held in set position by means moving longitudinally of the trap instead of vertically and connected directly with the bait support.

A further object is to provide a trap wherein all of the latch or trigger mechanism is on one side of the pivotal connection of the striker, and on that side occupied by the striker when in set position.

In the drawings: Figure 1 is a perspective view of the trap; and, Fig. 2 is a longitudinal vertical section.

The present embodiment of the invention, comprises a plate 1 of wood or other suitable material, and a substantially rectangular wire frame is connected to the plate at approximately the center thereof, and transverse to the plate. The said frame is composed of spaced side arms 2, connected at one end by an integral cross arm 3, and at the other end by a similar cross arm 3ª. A spring consisting of coils 4 and 5 spaced apart and connected by a loop 6 is provided for the frame, the coils encircling the cross arm 3ª. The coils are formed from wire, and each gradually increases in diameter from the outer end to the loop, and an arm 10 extends radially from the outer end of each coil. Each arm 10 extends toward the adjacent arm 2 of the frame, passing beneath the same, and the extremity of each arm 10 is bent upward at 11 to prevent its disengagement from the arm.

A staple 8 is arranged outside of each end of cross arm 3ª, and holds the said arm loosely to the plate, and a staple 9 holds the loop 6 to the plate. The staple 9 is driven tightly, so that the loop is firmly held.

A lever 12 is pivoted to the plate intermediate the ends of the lever, by means of a staple 13. The lever is of wire, and is bent to form a loop 14 extending directly upward. The wire forming the lever is doubled to form the loop, and in each end is then coiled once around the body of the staple 13 inside the arms of the loop, as indicated at 15, and thence in opposite directions to form the lever. One end of the lever extends beneath the cross arm 3ª of the frame, between the coils 4 and 5, and is provided with a ring 16, for holding the bait 17. The opposite end extends beneath the body portion 18 of a staple, whose legs 19 are connected to the plate 1, and the said end is bent into a ring 20.

A latch arm has one end bent or coiled around the body 18 of the staple, and one end 21 of the latch extends toward the loop 14, and is of sufficient length to engage in the same, as indicated in Fig. 1. The opposite end 22 is bent upwardly at 23, and laterally at 22 to engage over the cross arm 3 of the frame. The said cross arm is provided with an integral loop 24 at one side of its center, for convenience in swinging the frame to set the trap. The spring consisting of coils 4 and 5 is connected and held firmly to the plate by the staple 9, and is also connected to the frame by the arms 10. The spring acts to throw the frame over toward the bait, to strike the animal tampering with the bait held on the ring 16 of the lever.

The trap is set, by swinging the frame into the position of Fig. 1, and engaging the end 21 of the latch with loop 14. The latch arm 21 when so held by the loop, brings the catch 22 over the cross arm 3, thus holding the frame in set position of Fig. 1. When the end of lever 12 provided with ring 16 is depressed by the attempt of the animal to get at the bait, the top of the loop 14 is swung toward the coils 4 and 5, releasing the latch arm 21. The release of the latch arm releases catch 22, and the frame is swung over to the baited end of the trap, striking the animal and killing it, or holding it between the frame and the plate. The loop's engagement with the latch while delicate is sufficient to prevent accidental releasing of the frame, and the release of the frame is positive.

It will be noted that there is no danger of releasing the striker, that is the frame, accidentally when setting the trap in position. The loop 14 must be swung longitudinally of the plate.

I claim:

A trap comprising a base and a spring actuated striker, a lever pivoted to the base intermediate its ends and provided at one end with bait holding means, said lever having at its pivotal connection an upwardly extending loop rigid with the lever, a latch arm pivoted to the base adjacent to the end of the lever remote from the bait holding means, said latch having an arm engaging the rigid loop, and a lug for engaging over the striker for holding said striker in set position.

JOSEPH F. WINKLER.

Witnesses:
 PETER HARRIE,
 CASPER HALLER.

Copies of this patent may be obtained for five cents each, by addressing the "Commissioner of Patents, Washington, D. C."